(12) United States Patent
Koeppel et al.

(10) Patent No.: US 6,361,259 B1
(45) Date of Patent: Mar. 26, 2002

(54) SCREW FOR TORQUE-LIMITED FASTENING

(75) Inventors: Norbert Koeppel; Erich Palm, both of Au (CH)

(73) Assignee: SFS Industrie Holding AG, Heerbrugg (CH)

( * ) Notice: Subject to any disclaimer, the term of this patent is extended or adjusted under 35 U.S.C. 154(b) by 0 days.

(21) Appl. No.: 09/171,400

(22) PCT Filed: Apr. 10, 1997

(86) PCT No.: PCT/EP97/01773

§ 371 Date: Mar. 24, 1999

§ 102(e) Date: Mar. 24, 1999

(87) PCT Pub. No.: WO97/39248

PCT Pub. Date: Oct. 23, 1997

(30) Foreign Application Priority Data

Apr. 17, 1996 (DE) .......................................... 196 15 191

(51) Int. Cl.⁷ ................................................ F16B 25/10
(52) U.S. Cl. ........................................ 411/399; 411/188
(58) Field of Search ............................ 411/399, 1, 424, 411/387.1–387.3, 188

(56) References Cited

U.S. PATENT DOCUMENTS

| | | | | |
|---|---|---|---|---|
| 4,572,720 A | * | 2/1986 | Rockenfeller | 411/399 |
| 4,842,467 A | * | 6/1989 | Armstrong | 411/399 |
| 5,356,253 A | * | 10/1994 | Whitesell | 411/399 |
| 5,518,352 A | * | 5/1996 | Lieggi | 411/399 |
| 5,622,464 A | * | 4/1997 | Dill | 411/399 |
| 5,919,020 A | * | 7/1999 | Walther | |
| 6,000,892 A | * | 12/1999 | Takasaki | |
| 6,050,765 A | * | 4/2000 | McGovern | |

FOREIGN PATENT DOCUMENTS

| | | | | |
|---|---|---|---|---|
| DE | 1500748 | * | 10/1969 | 411/399 |
| DE | 2157212 | * | 7/1972 | 411/311 |

* cited by examiner

*Primary Examiner*—Flemming Saether
(74) *Attorney, Agent, or Firm*—Volpe and Koenig, P.C.

(57) ABSTRACT

In a screw for fastening sections to a substructure, a shank (2) is provided with a boring portion (4) and a threaded portion (5) as well as a screw head (3). The portion (6) of the shank (2) adjacent to the screw head (3) flares conically toward the screw head (3). On its underside (7) the screw head (3) is provided with projections and/or depressions. During use for fastening sections to a substructure, the section to be fastened is pressed by the conical portion (6) in screwing direction against the fexed substructure (11).

3 Claims, 2 Drawing Sheets

SCREW FOR TORQUE-LIMITED FASTENING

FIELD OF THE INVENTION

The invention relates to a screw for fastening metal and/or plastic sections or plates to a substructure, comprising a shank with a boring portion and a threaded portion as well as a drive portion for applying a driving tool.

SUMMARY OF THE INVENTION

The very act of fastening sections or plates to a substructure is problematic in that such parts must achieve a condition in which they press firmly against the substructure when fastened. These negative effects are intensified when relatively stiff sections or plates become further distorted under certain circumstances or exhibit a longitudinal twist. In this case it is usually not possible to work with a depth limiter for the driving device. Even if torque clutches are used, it is still difficult to stop the process at the precise time, since an associated torque increase occurs as soon as the screw head bears on the section to be fastened, thus stopping the driving device. Further driving movement is then stopped regardless of whether or not the metal and/or plastic section or plate to be fastened continues to bear on the substructure.

The object of the present invention was therefore to provide a screw of the type mentioned in the introduction, in the use of which the section or plate to be fastened bears snugly on the substructure in the finally set condition.

According to the invention, this is achieved by the fact that the portion of the shank adjacent to the drive portion flares conically toward the drive portion, and that the diameter of the end of the conical portion of the shank close to the drive portion is larger than the diameter of the borehole receiving the screw in the section to be fastened and thus is also larger than the boring diameter of the boring portion.

By virtue of these features according to the invention, the metal and/or plastic section to be fastened is subjected to initial tension directed toward the substructure and thus is pressed thereagainst as soon as the screw has been driven in by one or more rotations. Because of the associated friction in the borehole and of the conical shape, the conical portion of the shank adjacent to the screw head exerts a force in the screwing direction on the section to be fastened.

It then becomes a simple matter to adjust an appropriate torque clutch such that it disengages only at appropriately high torque. By that time, however, the section to be fastened has already been pressed snugly against the substructure by the action of the conical portion, and so all that remains is for the driving tool to be stopped as soon as the appropriate torque is reached.

The action of the conical portion on the borehole wall also produces extremely good locking against reverse rotation. The surface of the conical portion is for practical purposes disposed in a snug-fitting seat in the borehole wall. Furthermore, in the particular case of portions that have become distorted or twisted in the process, said portions have a tendency to return to their initial condition. Thereby an additional resilient load is always exerted on the screw, intensifying the locking effect against reverse rotation, especially in view of the action of the conical portion.

It is intuitively obvious that the beginning of the conical portion must extend from the shank or from an unthreaded portion of the shank, because this conical portion, while following the shank, must be inserted easily into the borehole in the section to be fastened. Thereafter, however, it is necessary that the conical portion engage as rapidly and effectively as possible with the borehole wall, so that thereby it can apply the axial initial tension optimally. In this way the tightening torque and therefore the axial initial tension are exerted on the section to be fastened as soon as the screw has been driven in a relatively short distance, before the process of driving the screw is fully accomplished.

Another advantage of the conical portion is that optimum fastening to a substructure is possible even if said substructure comprises a thin metal sheet or other thin materials. Since the conical portion for practical purposes represents the agency which initiates an associated torque increase, stripping of the thread in the substructure cannot occur.

DESCRIPTION OF THE PRIOR ART

From DE-OS 2157212 there is already known a screw in which a conical shank portion is provided at the head end of the shank to form a thicker region in order thereby to provide the shank with reinforcement to compensate for a drive slot for a screwdriver. Furthermore, incisions are provided on the underside of the head of the known screw in order to cut a recess into the workpiece and in this way to countersink the screw head in the workpiece.

From DE-OS 2238191 there is also known a fastening means which always comprises a screw and nut. The screw is drawn into a borehole by tightening the nut, and therefore is not itself rotated. In this case the conical portion of the screw is dimensioned such that the frictional force developed by tightening the nut prevents rotation of the shank in the hole. Even if the driving tool is designed to stop at a specified torque, it could not be stopped by such friction.

In another screw known from DE 4019157 C1, a shaped portion is provided in the region of the screw head. This portion engages in the material of the substructure in order to cause a sudden large increase in driving torque of the screw immediately upon contact with the substructure. This effect is desired for screws to be driven into a substructure with poor pull-out resistance, such as gas-formed concrete. Such an effect is not desired in the use of a screw in the manner according to the invention, nor is a shaped portion of this type employed. Instead, the increasing friction between a conical portion and the borehole is utilized to stop a driving tool by torque-dependent effect.

OBJECTS AND ADVANTAGES OF THE INVENTION

In another proposal according to the invention, the conical portion of the shank extends directly to the drive portion or to the underside of the drive portion formed as the screw head. This ensures that the borehole will be steadily widened until the screw is finally set. Thereby there is also achieved a steadily increasing torque, which can be sensed by a driving tool with an adjustable stopping reaction.

In this regard it is also important to note that torque-activated stopping must take place with great precision, since the engagement of the thread in the substructure can be damaged under certain circumstances, thus negating the fastening effect, if driving is stopped too late.

It can also be advantageous if the diameter of the end of the conical portion of the shank close to the drive portion is larger than the outside diameter of the threaded portion on the shank. Since the screw is provided with a boring portion and thus itself creates the through-hole in the section to be fastened and also the hole in the substructure, naturally the threaded portion is also driven through the section to be fastened. Thus a corresponding thread is cut first of all in the borehole of the section or plate to be fastened, while the axial initial tensions will be developed by the conical portion in the threaded borehole of the section to be fastened. For practical purposes, therefore, the formed thread turns are compressed again or pressed flat by the conical portion, and thereby the friction between the conical portion and the borehole wall is smaller at least in the first two rotations than if the borehole wall had been smooth.

In the very cases in which the screw must be set at an exact depth, or in other words a drive portion formed as a screw head must always bear exactly on the surface of the section or plate to be fastened, the drive portion formed as the screw head can be additionally provided on its underside with projections and/or depressions. It is then possible to adjust the torque clutch of a driving tool to disengage not as soon as the conical portion exerts an effect, but only when an appropriately large torque increase is caused suddenly by the projections and/or depressions provided on the underside of the screw head, or in other words when the screw head makes full surface contact with the section or plate to be fastened. Because of the previous action of the conical portion, the section or plate to be fastened has already been pressed snugly against the substructure, and so all that remains is for the driving tool to be stopped by an appropriately massive torque increase.

BRIEF DESCRIPTION OF THE DRAWINGS

Further features and special advantages according to the invention will be explained in more detail in the following description with reference to the drawings, wherein.

BRIEF DESCRIPTION OF THE PREFERRED EMBODIMENT(S)

Figure 2:
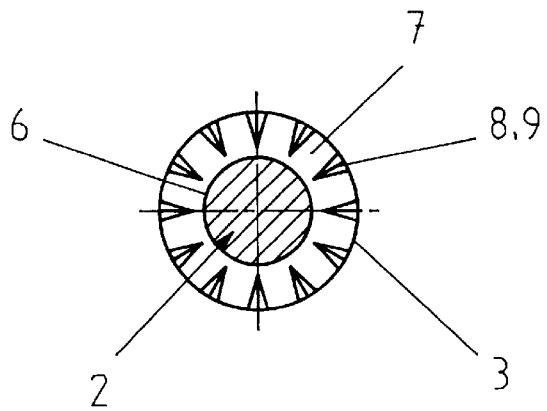
FIG. 2 shows a cross section through the line II—II in FIG. 1.
Figure 1:
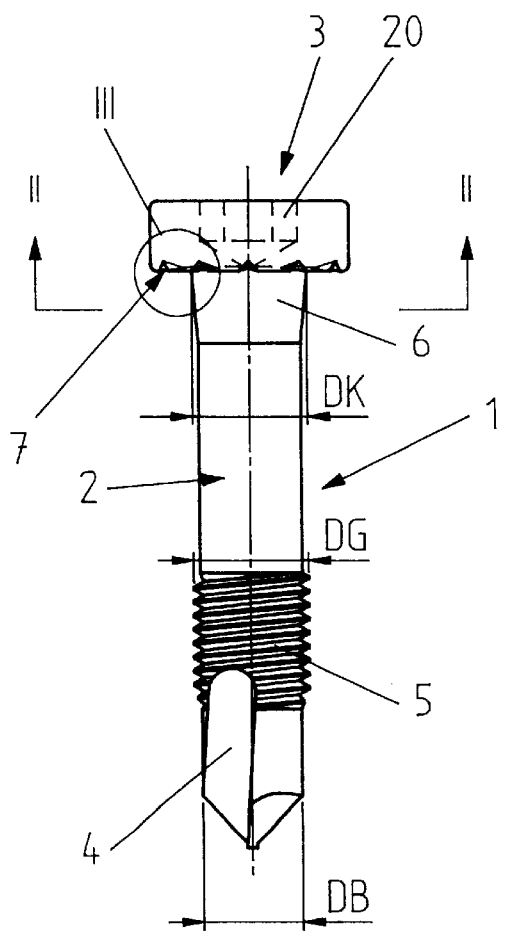
FIG. 1 shows an elevation of the screw according to the invention.
Figure 3:
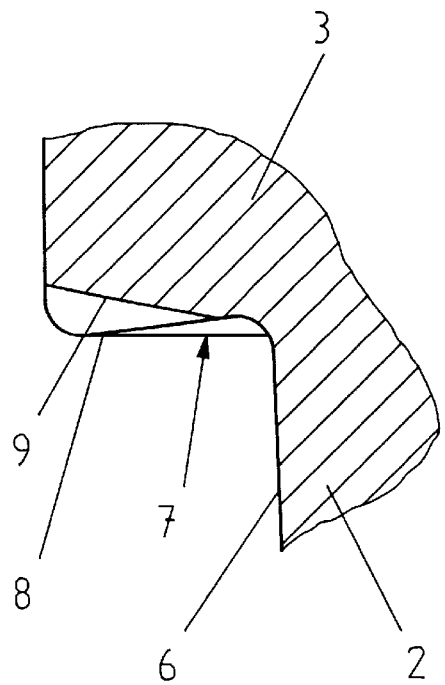
FIG. 3 shows a cross section through a portion of the screw denoted by III in FIG. 1.

The screw 1 according to the invention comprises a shank 2 and a drive portion formed as a screw head 3. Shank 2 is provided at one of its ends with a boring portion 4 and is also provided with a threaded portion 5. Portion 6 of shank 2 adjacent to screw head 3 is flared conically toward screw head 3. Screw head 3 is provided on its underside 7 with projections 8 and/or depressions 9. Projections 8 and/or depressions 9 can have the form of ribs, grooves, rippled ribs, roughened areas, individual points, serrated ribs or the like. Their purpose is to cause a torque load increase that is steady and if necessary suddenly becomes extremely large as the screw is being driven in, so that the driving tool can be stopped at the correct instant by means of an appropriate torque clutch. For this purpose it is immaterial whether said torque clutch reacts mechanically or electronically or whether a hydraulic control device is used.

Figure 4:
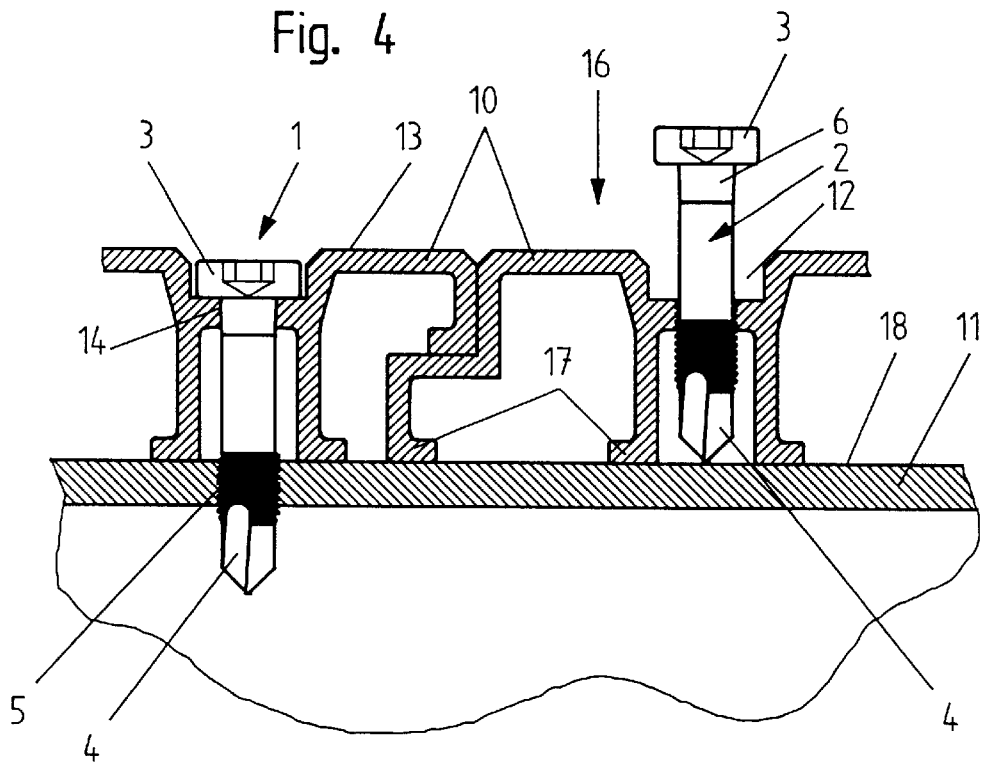
FIG. 4 shows a cross section through a fastening application of the screw according to the invention, where sections are being fastened to a fixed substructure.

Conical portion 6 of shank 2 extends directly to underside 7 of screw head 3. The diameter DK of the end of conical portion 6 close to the screw head is larger than the diameter of the borehole 14 which receives screw 1 in the section 10 to be fastened. Accordingly, diameter DK is naturally also larger than the boring diameter DB of boring portion 4. To achieve an appropriate optimum effect, diameter DK of the end of conical portion 6 close to the screw head is larger than the outside diameter DG of threaded portion 5 on shank 2. Screw 1 is used to fasten sections 10 to a substructure 11, as can be seen in FIG. 4, for example. In the present diagram, metal sections such as aluminum sections are being fastened to a substructure 11 which itself is made of metal sections such as aluminum or steel sections. Appropriate recesses or long slots 12 can be provided in the sections 10 to be fastened, so that the fastening effect is achieved in slots 12. Thereby screw heads 3 are disposed in countersunk relationship with the outside surface 13 when in the finally set condition. However, it is also entirely possible to use a screw configured according to the invention for fastening plastic sections on a corresponding substructure 11 of plastic sections or even of metal sections.

Figure 5:
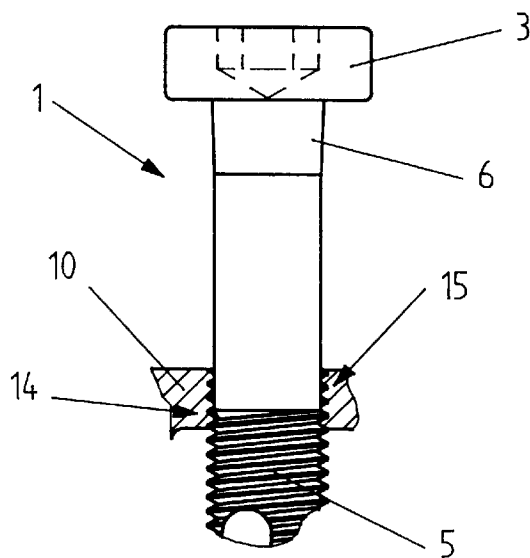
FIG. 5 shows a partial front elevation of the screw during the driving process with the penetrated portion of the section to be fastened.
Figure 6:
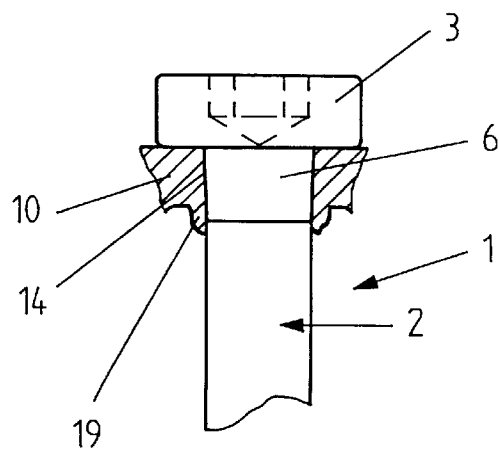
FIG. 6 shows a partial front elevation of the screw in the finally set condition, wherein the portion of the section to be fastened immediately surrounding the screw is also shown.

As can be seen directly from FIG. 4 and FIGS. 5 and 6, borehole 14 is created first of all by boring portion 4 in section 10 to be fastened while screw 1 is being driven. Threaded portion 5, which follows boring portion 4, then forms a corresponding thread 15 in borehole 14 of section 10 to be fastened. Thereupon boring portion 4 comes into contact with substructure 11, where it bores a corresponding hole in which threaded portion 5 in turn can mate. Threaded portion 5 creates a corresponding mechanical fastening effect in fixed substructure 11. As soon as the borehole has been created in fixed substructure 11, conical portion 6 at the end of shank 2 close to the screw head reaches insertion position, while conical portion 6 presses against the wall of borehole 14 or against the thread 15 created in borehole 15[sic]. Because of the conical shape of portion 6, section 10 to be fastened is subjected to initial tension while the screw is being driven in screwing direction 16, and so the lower portions 17 of section 10 to be fastened are pressed firmly against upper side 18 of substructure 11. An appropriate tightening torque is therefore produced in axial direction, and so sections 10 to be fastened are always pressed securely and snugly against fixed substructure 11 and bear thereon. Proper contact of sections 10 is achieved even if they happen to be distorted or twisted.

It is also obvious from FIG. 6 that squeezing out of material can occur due to the action of conical portion 6 on the underside of borehole 14, and so for practical purposes a circumferential ridge 19 is formed. Depending on the material of sections 10 to be fastened, the material displacement due to conical portion 6 may cause small or large deformation or no deformation whatsoever.

In this type of application, or in other words where setting to exact depth is required, it is merely necessary to ensure that an appropriate tightening effect is produced by the conical portion used and a sudden torque increase is achieved due to insertion of the underside of the screw head with the appropriate projections and/or depressions.

As a conceivable alternative, conical portion 6 does not extend directly to underside 7 of the screw head, but to said conical portion 6 there is attached, for example, a short cylindrical portion, which then merges into underside 7 of screw head 3. Associated accommodation of material due to the contact pressure of conical portion 6 would be possible if a circumferential groove were provided on underside 7 of screw head 3. It is nevertheless still possible in this case to provide projections and/or depressions on an appropriate annular zone on underside 7 of screw head 3, so that the necessary sudden torque increase can occur.

The drawing illustrates a screw with a cylindrical screw head 3. In this screw head there is provided a central socket 20 for insertion of a screwing tool. Within the scope of the invention, it would also be entirely conceivable to form, in the manner according to the invention, screws with an appropriate external drive and a screw head shaped as a countersunk head instead of the cylindrical screw head 3.

If a screw does not have to be set at an exact depth, or in other words if such screws are concealed by lining or similar elements after having been appropriately set, or if the driving tool offers exact adjustment capabilities for stopping the driving tool suddenly as soon as a smooth underside of a screw head makes contact, projections and/or depressions are not required on the underside of the screw head.

If the screw can be set simply by developing an appropriately high torque to start [sic] the driving tool, conical portion 6 alone is then sufficient, and so a screw head is not even needed. In this case it is merely necessary to provide an appropriate drive portion, which can be formed either as an internal drive or as an external drive. For example, it would be conceivable to design such screws with a hexagon head or a hexagon socket or other internal or external drives. In this case the diameter of the drive portions can be equal to or smaller than or even slightly larger than the associated end of conical portion 6.

By virtue of the large torque increase when the conical portion engages, it is ensured with certainty that the driving tool will be stopped before any damage is suffered by the thread in the substructure, and so a screw according to the invention can also be used advantageously for thin metal sheets or in any case for a substructure of thin material. Appropriate locking against reverse rotation is also ensured by the conical portion.

What is claimed is:

1. A screw adapted for torque-limited fastening of metal or plastic sections or plates to a substructure, comprising a shank with a boring portion having a boring diameter, a threaded portion, an unthreaded portion having a diameter which is less than an outer diameter of the threaded portion, and a drive portion adapted for applying a driving tool and having an underside which is generally perpendicular to the screw axis, the shank further comprising a portion adjacent to the drive portion that flares conically from the unthreaded portion toward the drive portion underside and having a diameter at the end of the conical portion of the shank close to the drive portion underside that is larger than the diameter of a borehole adapted to be formed by the boring portion which receives the screw in a section to be fastened and thus is also larger than the boring diameter of the boring portion, wherein the diameter at the end of the conical portion of the shank close to the drive portion underside is also larger than the outer diameter of the threaded portion and wherein as a result of an axial force generated by screwing the screw into a substructure, the conical portion is pulled into the borehole accommodating the screw and at the same time causes a torque increase to prevent stripping of the threaded portion in the substructure.

2. A screw according to claim 1, wherein the drive portion is defined as a screw head and the conical portion of the shank extends directly to the underside of the drive portion.

3. A screw according to claim 1, wherein the drive portion is formed as the screw head and is provided on the underside with projections and depressions for causing a torque load increase.

* * * * *